United States Patent Office 3,089,679
Patented May 14, 1963

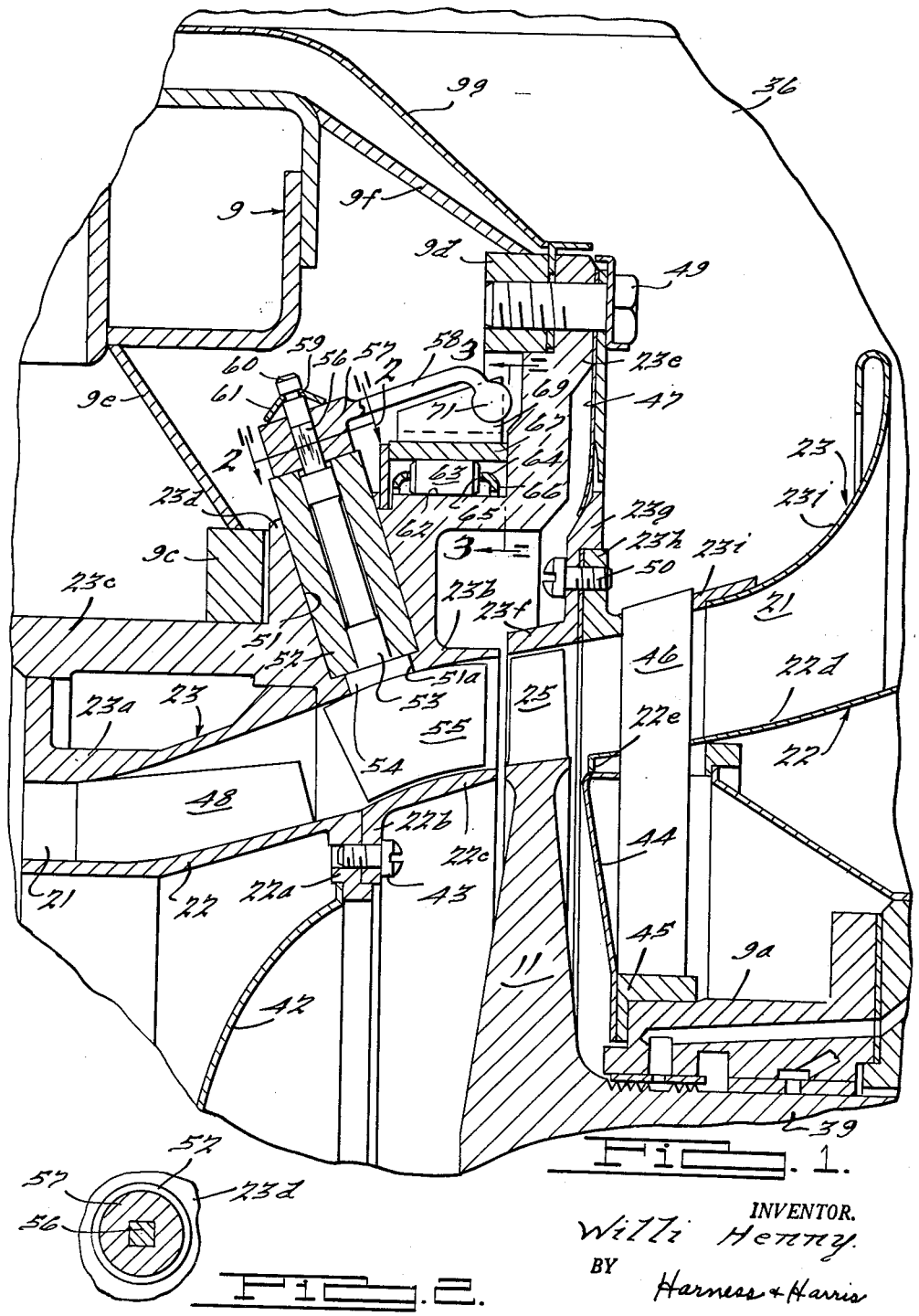

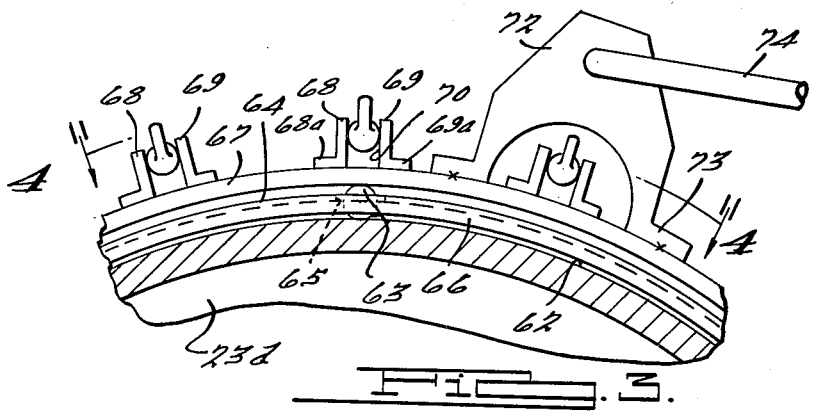
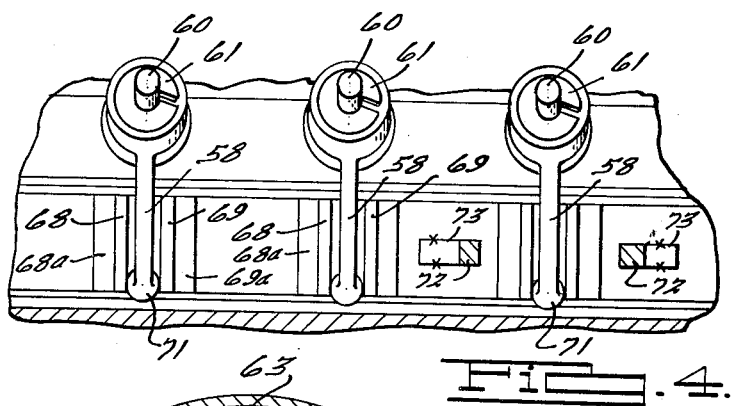
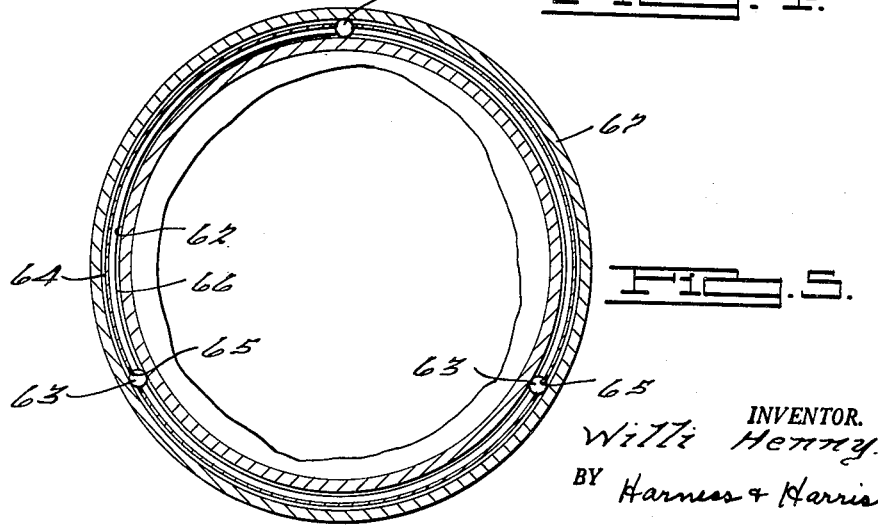

3,089,679
GAS TURBINE NOZZLE SUSPENSION AND ADJUSTMENT
Willi Henny, Southfield, Mich., assignor to Chrysler Corporation, Highland Park, Mich., a corporation of Delaware
Filed June 6, 1960, Ser. No. 34,172
5 Claims. (Cl. 253—59)

This invention relates to an adjustable nozzle assembly for a gas turbine engine.

In a common type of gas turbine engine, an annular conduit comprising inner and outer shrouds conveys hot motive gases to the peripheral blades of a coaxial rotor to drive the same. Within the conduit immediately in advance of the rotor blades are arranged a plurality of adjustable nozzles for adjusting the angle of attack of the motive gases against the rotor blades. Reference may be had to Huebner et al. Patent No. 2,795,928 for details of a gas turbine engine of the type with which the present invention is concerned.

Among the problems in the construction of such an engine is the provision of a simple mounting for the adjustable nozzles whereby the latter are unencumbered by either of the shrouds or conduit walls but are readily engageable by an exterior adjusting mechanism for selective adjustment thereby. Other problems are the provision of simple means for adjustably supporting the nozzles and for preventing leakage of the high temperature and comparatively high pressure motive gases from the conduit at the region of the nozzle mounting, and the provision of such a mounting which positively and accurately holds the nozzles in their desired adjusted positions without play or lost motion.

An object of the present invention is to provide an improved highly efficient adjustable nozzle assembly for a gas turbine engine which avoids the above problems and which is particularly simple and economical to manufacture and assemble.

Another and more specific object is to provide such a nozzle assembly comprising a plurality of circumferentially spaced annular bushings secured within the outer shroud with their axes extending generally radially with respect to the axis of the coaxial shroud and rotor, each bushing being preferably press fit within a mating bore in the outer shroud to provide a fluid seal around the bushing. A pivotal nozzle supporting shaft is journalled within one of each of the bushings and is provided with an integral enlarged annular seat at its lower end seated against the inner end of the annular bushing around the shaft in fluid sealing relationship. Inwardly of the seat, each shaft is secured to one of each of the adjustable nozzles within the annular conduit. At the outer end of each shaft and exteriorly of the outer shroud is secured a swinging arm seated on the outer end of the bushing and arranged to pivot the shaft and nozzle upon swinging of the arm. The shaft extends outwardly beyond the swinging arm and is secured to a resilient washer under compression against the arm to urge the latter inwardly positively against the bushing and to urge the shaft outwardly, thereby to maintain the seat of the latter in the aforesaid fluid sealing engagement with the inner end of the bushing. An outer portion of the outer shroud adjacent the nozzles is formed to provide a cylindrical support coaxial with the shrouds and rotor. Rotatably journalled on the support is a ring having a plurality of radially outwardly opening slots in its outer surface, one slot containing the swinging end of one of each of the swinging arms to swing the same upon rotation of the ring.

Other objects of this invention will appear in the following description and appended claims, reference being had to the accompanying drawings forming a part of this specification wherein like reference characters designate corresponding parts in the several views.

FIGURE 1 is a fragmentary mid-sectional view through a two-stage gas turbine engine embodying the present invention, taken along the common axis of the engine's rotors and showing details of the mounting for one of the adjustable nozzles.

FIGURE 2 is a fragmentary sectional view taken in the direction of the arrows substantially along the line 2—2 of FIGURE 1.

FIGURE 3 is a fragmentary sectional view taken in the direction of the arrows substantially along the line 3—3 of FIGURE 1.

FIGURE 4 is a fragmentary view taken in the direction of the arrows substantially along the arcuate line 4—4 of FIGURE 3.

FIGURE 5 is a reduced fragmentary sectional view through the nozzle actuating ring and its cylindrical support and roller mounting, taken in the direction of the cylindrical axis.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings and particularly to FIGURE 1, a gas turbine engine embodying the present invention is illustrated comprising a housing indicated generally by the numeral 9 which carries first and second stage rotors arranged coaxially in tandem. Only a portion of the second stage rotor 11 is illustrated herein. A typical automotive gas turbine engine of the type with which the present invention is concerned is illustrated in detail in the aforesaid Huebner et al. Patent No. 2,795,928, it being sufficient to state herein that pressurized combustion supporting air is discharged from an engine driven compressor, preheated by a regenerator, admixed with fuel which is burned in a combustion chamber to supply the driving energy, and then conveyed into an annular conduit 21 coaxial with the rotors and defined by inner and outer shrouds 22 and 23. Conduit 21 conveys the combustion products first to the blades of the first stage rotor, then to the peripherally disposed blades 25 of rotor 11 to drive the corresponding rotors, then by way of collecting chamber 36 to the regenerator, not shown, to heat the same.

The gas driven rotor 11 is secured to a coaxial shaft 39 journalled in a bearing portion 9a of housing 9 and is connected by a speed reducing gear train with the vehicle wheels to propel the same. Upstream of rotor 11 is a diaphragm 42 which completely seals the interior of the shroud 22 against axial flow of gases between the two rotor stages to prevent bypassing of the first rotor stage by the motive gases. The peripheral portions of diaphragm 42 are closely fitted into a notch within a radially inturned flange 22a of an annular section of the inner shroud 22 which is secured by bolts 43 to a correspondingly inturned flange 22b of an annular section 22c of the inner shroud 22. Upstream of rotor 11, shroud section 22c terminates adjacent the roots of the rotor blades 25 and cooperates with an annular terminal section 22d of the inner shroud 22 located downstream of the rotor 11 to complete the inner shroud assembly. A radially inturned annular flange 22e of shroud section 22d tightly engages the outer periphery of an annular inner diaphragm 44 which closes the interior of the inner shroud 22 downstream of rotor 11. The inner circumference of diaphragm 44 extends closely to the cylindrical portion 9a of the engine housing within which the rotor shaft 39 is journalled and is secured to the annular base 45 of a plurality of radial struts 46. Three such struts in the present instance extend through and are secured to the inner shroud section 22d to support the same.

The outer shroud 23 includes an annular section 23a supported on the outer peripheral edges of a plurality of circumferentially disposed fixed interstage nozzle blades 48 secured to and supported by a section of the inner shroud 22. Downstream of the shroud section 23a and substantially continuous therewith is an annular outer shroud section 23b having an annular reinforcing flange 23c overlying shroud section 23a and also having a radially extending annular outer boss 23d and flange 23e secured as for example by bolts 49 to bracket elements 9c and 9d respectively of the engine housing. Suitable bulkheads 9e, 9f, and 9g of the engine housing connected to the bracket portions 9c and 9d reinforce the housing structure, the bulkhead 9g also defining an inner wall of chamber 36.

The outer shroud section 23b terminates adjacent the outer periphery of the rotor blades 25 in juxtaposition with an annular outer shroud section 23f having a radial flange 23g secured by means of bolts 50 to a cooperating radial flange 23h of an annular outer shroud section 23i. Shroud section 23i is secured to the outer ends of the struts 46 and overlies an annular terminal shroud section 23j to complete the outer shroud assembly 23. The complete inner shroud assembly 22 includes the various flanges and sections 22a through 22e cooperating to provide a substantial continuous inner wall for the annular gas passage 21. Similarly the complete outer shroud assembly 23 includes the various flanges and outer shroud sections 23a through 23j cooperating to provide a substantially continuous outer wall for the conduit 21. The plurality of circumferentially spaced interstage fixed nozzles 48 in conduit 21 downstream of blades 25 space the associated portions of the shrouds 22 and 23 and direct the flow of motive gases to a plurality of circumferentially arranged adjustable nozzles 55 arranged immediately upstream of rotor blades 25 as described below.

Extending in the shroud boss 23d generally radially with respect to the axis of rotor 11 and spaced circumferentially around the latter is a plurality of bores 51 for a corresponding plurality of tubular bushings 52 snugly pressed into the bores 51 in fluid sealing relationship therewith to prevent radial leakage of motive gases from conduit 21 between the juxtaposed portions of each of the bushings 52 and boss 23d. Journalled coaxially within the bore of each bushing 52 is a pivotal shaft 53 having an integral coaxial annular enlargement or seat 54 at its lower end seated within a restriction 51a of bore 51 and against the inner end of bushing 52 to provide a fluid tight seal therewith entirely around the circumference of shaft 53. Inwardly of the enlargements 54, each shaft 53 is integrally secured to one of each of the adjustable nozzles 55. Twenty-three such nozzles are provided in the present instance, each being pivotal upon pivoting of the associated shaft 53 so as to vary the angle of contact between the motive gases in conduit 21 and the blades 25.

The upper end of each shaft 53 is formed with a reduced portion 56 of square cross section, FIGURE 2, on which is splined the hub 57 of a swinging arm 58. Above the square section 56, an annular groove 59 is formed in an upper cylindrical portion 60 of shaft 53 having a diameter equal to a side of the square portion 56. Groove 59 contains a cupped C-shaped spring washer 61 under compression against the upper face of the hub 57 to urge shaft 53 upwardly and hub 57 downwardly with respect to each other in FIGURE 1. Thus the annular seat 54 is maintained in sealing relation with the inner end of bushing 52 and the hub 57 is held in seated position against the upper end of bushing 52. By this arrangement, each nozzle or blade 55 is maintained positively and firmly in its desired position within the conduit 21 and is readily pivotal upon pivoting of shaft 53, but fluid leakage from conduit 21 radially outwardly along shaft 53 is prevented by the annular seal 54 engaging the lower end of bushing 52.

Also comprising a portion of shroud boss 23d is a radially outwardly facing cylindrical bearing support 62 coaxial with the rotor 11 and annular conduit 21. A plurality of rollers 63 ride on the cylindrical surface of support 62 and are maintained in circumferentially spaced relationship by a retaining race 64, FIGURES 3 and 5, comprising a sheet metal ring stamping coaxial with the cylindrical support 62 and having a plurality of circumferentially spaced slots 65 loosely confining one of each of the rollers 63 therein. In order to maintain the slots 65 near the axes of the rollers 63, the lateral edges of the cage 64 are bent inwardly at 66 so as to ride on support 62, FIGURE 1.

Freely journalled on the rollers 63 coaxially with the cylindrical support 62 is a ring 67 of larger diameter than support 62 and having a purality of pairs of brackets 68 and 69, FIGURES 3 and 4, corresponding to the number of nozzles 55. The brackets 68 and 69 of each pair are provided with footings 68a and 69a respectively welded to the outer circumference of the ring 67 in spaced relationship to provide a radially outwardly opening slot 70 to confine the terminal ball end 71 of one of each of the swinging arms 58 therein.

As indicated in FIGURE 1, the annular conduit 21 upstream of rotor 11 at the region of the nozzles 55 diverges axially downstream. The axis of shaft 53 extends generally radially to the axis of rotor 11 but at a slight angle determined by the angle of axial divergence of conduit 21. Thus the axis of shaft 53 extends perpendicularly to conduit 21 at the region of the circumferentially spaced nozzle blades 55. Each arm 58 when aligned with an axial plane of the rotor 11 extends parallel to the adjacent portion of the conduit 21. Accordingly the outer edges of the brackets 68 and 69 are inclined correspondingly.

Overlying one of the pairs of brackets 68 and 69 is a yoke 72 having footings 73 welded to the outer surface of the ring 67. A radially outer portion of yoke 72 is pivotally secured to a reciprocable actuating lever 74. Upon reciprocation of lever 74, ring 67 is rotated in one direction or the reverse about the axis of support 62 so as to carry the ball ends 71 and swing the several arms 58 and associated nozzle spindles 53 simultaneously. The latter are thus pivoted to adjust the angular position of the nozzles 55 in unison with respect to the blades 25 as desired. In this action, the ball ends 71 are free to slide axially in their respective slots 70 as the ring 67 rotates and the arms 58 swing about the axes of their respective shafts 53.

The inner and outer ends of the nozzle blades 55 are shaped spherically about radii extending along the axes of their associated spindles 53 and centered at the intersection of these radii on the axis of the rotor 11. Correspondingly, at the regions of the blades 55, the juxtaposed portions of the outer shroud section 23b and inner shroud section 22c are formed spherically about radii similarly centered. Thus upon pivotal adjusting movement of the blades 55, the clearance between their inner and outer edges and the adjacent inner and outer shroud sections will remain the same.

I claim:

1. In combination, a gas driven rotor for a turbine engine, a conduit for conveying motive gases to said rotor, a plurality of adjustable means spaced circumferentially around the axis of said rotor, each adjustable means including a nozzle element within said conduit adjacent said rotor and pivotal to vary the angle of attack of said gases against said rotor, a rotatable shaft secured to said nozzle element to pivot the latter and extending therefrom radially outwardly with respect to said axis, an annular seat of larger diameter than said shaft and carried coaxially thereby in fluid sealing relationship therewith, an annular bushing carried by the wall of said housing and having said shaft journalled therein, the outer periphery of said bushing being in fluid sealing engagement with said wall, said wall having an annular portion around said seat in endwise abutment with an annular portion of the inner end of said bushing around said seat to locate said bushing with respect to said wall, another annular portion of the inner end of said bushing abutting said seat in fluid sealing engagement therewith around the axis of said shaft, and resilient means yieldingly urging said shaft outwardly and said bushing inwardly with equal and opposite forces to maintain said fluid sealing engagement between said bushing and seat.

2. In combination, a gas driven rotor for a turbine engine, an annular conduit for conveying motive gases to said rotor comprising inner and outer shrouds, a plurality of adjustable means spaced circumferentially around the axis of said rotor, a separate bore associated with each adjustable means and extending generally radially through said outer shroud, each bore being restricted adjacent its radially inner end to provide an annular shoulder of said outer shroud around the bore, a tubular bushing confined within each bore with its radially inner end seated against the associated annular shoulder, each bushing being in fluid sealing engagement with the sidewall of the associated bore in said outer shroud to prevent radial flow of gases between said outer shroud and bushing, the interior diameter of each tubular bushing at its radially inner end being smaller than the interior diameter of the associated annular shoulder, thereby to provide an annular seat portion of said bushing overlapping said annular shoulder, each adjustable means including a nozzle element within said conduit adjacent said rotor and pivotal to vary the angle of attack of said gases against said rotor, a rotatable shaft secured to said nozzle element to pivot the latter and journaled coaxially in the associated bushing, an annular seat portion of larger diameter than said shaft and carried coaxially thereby in fluid sealing relationship therewith, the last named seat portion being in coaxial fluid sealing engagement with the radially inner end surface of the annular seat portion of the associated bushing to prevent flow of gases into the radially inner end of each tubular bushing, said shaft extending axially through the outer end of said bushing, and means including resilient means engaging the outer ends of said shaft and bushing to urge said shaft outwardly and said bushing inwardly with equal and opposing forces to maintain said fluid sealing engagement between said radially inner end surface of said bushing and said annular seat portion carried by said shaft.

3. In combination, a gas driven rotor for a turbine engine, an annular conduit for conveying motive gases to said rotor comprising inner and outer shrouds, a plurality of adjustable means spaced circumferentially around the axis of said rotor, a separate bore associated with each adjustable means and extending generally radially through said outer shroud, each bore being restricted adjacent its radially inner end to provide an annular shoulder of said outer shroud around the bore, a tubular bushing confined within each bore with its radially inner end seated endwise against the associated annular shoulder, each bushing being insertable radially into its associated bore from the outer end of the latter and being in fluid sealing engagement with the sidewall of the associated bore to prevent radial flow of gases between said outer shroud and bushing, the interior diameter of each tubular bushing at its radially inner end being smaller than the interior diameter of the associated annular shoulder thereby to provide an annular seat portion of said bushing overlapping said annular shoulder, each adjustable means including a nozzle element within said conduit adjacent said rotor and pivotal to vary the angle of attack of said gases against said rotor, a rotatable shaft secured to said nozzle element to pivot the latter and journaled coaxially in the associated bushing, each shaft having an integral annular enlargement comprising a seat portion coaxial with the annular seat portion of the associated bushing and in fluid sealing engagement with the radially inner end surface of the latter seat portion to prevent flow of gases into the radially inner end of each tubular bushing, said shaft extending axially through the outer end of said bushing, and means including resilient means engaging the outer ends of said shaft and bushing to urge said shaft outwardly and said bushing inwardly with equal and opposing forces to maintain said fluid sealing engagement between said radially inner end surface of said bushing and said annular seat portion carried by said shaft.

4. In combination, a gas driven rotor for a turbine engine, a conduit for conveying motive gases to said rotor, adjustable nozzle means for varying the angle of attack of said gases against said rotor, said nozzle means including a nozzle element in said conduit, a rotatable shaft extending generally radially with respect to the axis of said rotor and secured to said element, an integral annular seat around the radially inner end of said shaft, annular bushing means carried by the wall of said conduit and having said shaft rotatable therein, the outer periphery of said bushing means around said shaft being in fluid sealing relationship with said wall, the inner end of said bushing means having annular seat means in endwise abutment with the first named seat in fluid sealing relationship to minimize leakage of said gases along said shaft, and said wall having an annular portion coaxial with said shaft and abutting a portion of said seat means endwise to locate said bushing means with respect to said wall, and resilient means yieldingly urging said shaft outwardly and said bushing means inwardly with equal and opposite forces to urge said seat and seat means into said fluid sealing relationship with each other.

5. In combination, a rotor for a gas turbine engine, an annular conduit for conveying motive gases to said rotor comprising inner and outer shrouds coaxial with said rotor, adjustable nozzle means arranged circumferentially around said rotor for adjustably determining the angle of attack of said gases against said rotor, said nozzle means including a plurality of circumferentially spaced nozzle elements in said conduit, a tubular bushing associated with each nozzle element and carried by said outer shroud, each bushing having a bore extending therethrough generally radially with respect to the axis of said rotor, a shaft journalled in the bore of each bushing and having its radially inner end secured to the associated nozzle element to pivot the same upon rotation of said shaft, the latter having an enlarged annular seat portion seated endwise against a radially inwardly facing mating annular seat portion of the associated bushing, said seat portions extending around said shaft in fluid sealing relationship to prevent gas leakage along said shaft, the inner wall of said outer shroud adjacent each nozzle element having an annular abutment inwardly of and coaxial with the radially inwardly facing annular seat portion of each bushing and firmly abutting the latter seat portion endwise to locate each bushing with respect to said outer shroud, a separate swinging arm having a hub seated on a radially outwardly facing seat of the associated bushing and secured to the outer end of each shaft to rotate the latter upon swinging of the associated arm, each shaft having an extension radially outward beyond the hub of the associated arm, spring means engaging the extension of each shaft and the associated hub to urge said hub and last named seat toward each other in seated relationship and also to maintain the first named two seats in seated relationship, means engageable with the swinging arm secured to each shaft to swing said arms in unison.

References Cited in the file of this patent

UNITED STATES PATENTS

| | | | |
|---|---|---|---|
| 2,651,482 | Fielden | Sept. | 8, 1953 |
| 2,778,564 | Halford | Jan. | 22, 1957 |
| 2,827,224 | Madison | Mar. | 18, 1958 |
| 2,862,654 | Gardiner | Dec. | 2, 1958 |
| 2,930,579 | Boyd et al. | Mar. | 29, 1960 |
| 2,933,235 | Neumann | Apr. | 19, 1960 |
| 2,955,744 | Hemsworth | Oct. | 11, 1960 |
| 2,957,228 | Stoddard | Oct. | 25, 1960 |
| 3,030,072 | Boyd | Apr. | 17, 1962 |
| 3,044,262 | Chadwick et al. | July | 17, 1962 |

FOREIGN PATENTS

| | | | |
|---|---|---|---|
| 754,637 | Germany | Dec. | 20, 1956 |
| 805,015 | Great Britain | Nov. | 26, 1958 |

OTHER REFERENCES

U.S. N.A.C.A. Research Memorandum RM E52G03 (1952) page 27 only.